PATENTED AUG 15 1871

Alger's Method of Attaching Wheels to Axle

117958

Witnesses

Inventor
Francis Alger

UNITED STATES PATENT OFFICE.

FRANCIS ALGER, OF BOSTON, MASSACHUSETTS.

IMPROVEMENT IN METHODS OF ATTACHING WHEELS TO AXLES.

Specification forming part of Letters Patent No. 117,958, dated August 15, 1871; antedated August 3, 1871.

*To all whom it may concern:*

Be it known that I, FRANCIS ALGER, of Boston, county of Suffolk and State of Massachusetts, have invented a certain new and useful Improved Method of Attaching Wheels to Axles, of which the following is a specification:

The nature of my invention consists in combining with the driving-axle two disks, one of the disks being rigidly attached to the axle, and is made with notches, having each a radial and sloping side, the sloping side of one notch being in opposition to the sloping side of the other notch, so that a sliding pawl attached to the wheel will prevent the axle from revolving in one or the other direction, according to which notch it is in. The second disk is attached to a sleeve on the axle and has a slight motion independent of the axle; the disk is also so arranged that cams on its periphery will, under certain circumstances, cover the notches on the first disk—that is, if the carriage is being driven by the axle forward, one of the notches in the fixed disk will be covered so that the pawl will not enter it, but if the axle is being driven backward then the other notch in the fixed disk will be covered. By this arrangement I am enabled to turn a locomotive road-carriage when it is going in either direction, as the wheels are always free to revolve faster than the axle, so that there is no strain on the axle in turning the carriage either in going backward or forward.

Figure 1:
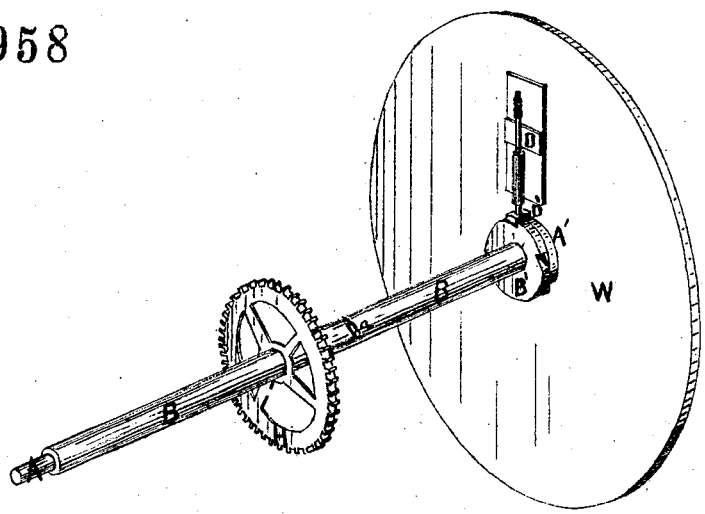
Figure 2:
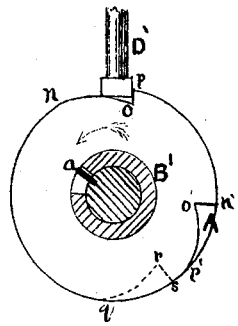
Figure 3:
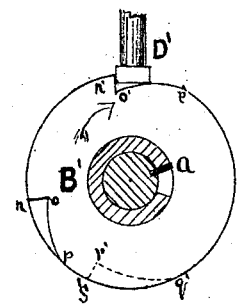

Figure 1 represents a perspective view, showing the axle, the driving-wheel, and one of the road-wheels. Figs. 2 and 3 are plans to illustrate the action of my invention.

A represents the main or driving-axle of the carriage, and has upon its end the disk A'. B is a loose sleeve or tube, through which the axle passes. The sleeve B has affixed to it the gear-wheel H and the cam-disk B'. Each of the road-wheels upon the axle A has a sliding pawl, D D', one of which is shown in Fig. 1. The tube B has a slight motion on the axle A, which motion is limited by the slot and pin at $a$, Fig. 1, the pin being inserted in the axle so that the axle cannot revolve either way but slightly, except the tube B and disk B' also revolve.

The action of my invention may be explained as follows: Each of the wheels attached to the axle A is provided with a pawl like D D', Fig. 1, which fits the notches of the disk A; these notches are indicated by dotted lines $q\ r\ s$ and $q'\ r'\ s'$, Figs. 2 and 3, and are so arranged as to catch the pawl in going in opposite directions. The notches $q\ r\ s\ q'\ r'\ s'$ on the disk A and the inclines $u\ o\ p\ u'\ o'\ p'$ on the disk B' are so arranged in relation to each other and the motion allowed the tube B by the pin $a$ that when the carriage is to advance the pawl engages with the notch as shown in Fig. 3, but when the carriage is backed then the pawl engages with the notch as indicated in Fig. 2; in either case the opposite notch will be covered by one of the inclines $u\ o\ p$ or $u'\ o'\ p'$ of the disk B', so that the wheel may go faster than the axle if it has a tendency so to do.

I claim as my invention—

The combination of the axle A, the tube B, disk B', disk A', and D D', or their mechanical equivalents, substantially as described and for the purpose set forth.

FRANCIS ALGER.

Witnesses:
  JAS. S. CONANT,
  FRANK G. PARKER.